United States Patent
Jun (10) Patent No.: US 11,861,099 B2
(45) Date of Patent: Jan. 2, 2024

(54) LIGHT EMITTING DISPLAY APPARATUS

(71) Applicant: LG Display Co., Ltd., Seoul (KR)

(72) Inventor: HyoYoung Jun, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 9 days.

(21) Appl. No.: 17/489,374

(22) Filed: Sep. 29, 2021

(65) Prior Publication Data

US 2022/0100343 A1  Mar. 31, 2022

(30) Foreign Application Priority Data

Sep. 29, 2020 (KR) .......................... 10-2020-0127074

(51) Int. Cl.
*G06F 3/041* (2006.01)
*G06F 1/18* (2006.01)

(52) U.S. Cl.
CPC .......... *G06F 3/04164* (2019.05); *G06F 1/189* (2013.01); *G06F 3/0412* (2013.01)

(58) Field of Classification Search
None
See application file for complete search history.

(56) References Cited

U.S. PATENT DOCUMENTS

2012/0006978 A1\* 1/2012 Ludwig ................ G06F 3/0421
250/214.1

FOREIGN PATENT DOCUMENTS

| CN | 108491801 A | \* | 9/2018 | ........... G06F 3/0412 |
| KR | 10-2016-0054746 A | | 5/2016 | |
| KR | 20160054746 A | \* | 5/2016 | |

OTHER PUBLICATIONS

Translation of CN-108491801-A into English; MA (Year: 2018).\*
Translation of KR-20160054746-A into English; Shim (Year: 2016).\*

\* cited by examiner

*Primary Examiner* — Brian M Butcher
(74) *Attorney, Agent, or Firm* — Birch, Stewart, Kolasch & Birch, LLP (57) ABSTRACT

A light emitting display apparatus can include a substrate including a display area, and a non-display area outside of the display area; a power supply wiring part disposed in the non-display area; a first power supply wiring disposed in the power supply wiring part; a second power supply wiring disposed on the first power supply wiring; and a third power supply wiring electrically connected to the second power supply wiring.

20 Claims, 8 Drawing Sheets

LIGHT EMITTING DISPLAY APPARATUS

CROSS-REFERENCE TO RELATED APPLICATIONS

This application claims the priority benefit of Korean Patent Application No. 10-2020-0127074 filed on Sep. 29, 2020, in the Republic of Korea, the entirety of which is incorporated herein by reference into the present application.

BACKGROUND

Technical Field

The present disclosure relates to a light emitting display apparatus, and more particularly, to a light emitting display apparatus having improved brightness uniformity.

Description of the Related Art

Unlike a liquid crystal display apparatus, a light emitting display apparatus does not require a separate light source (e.g., a backlight is not needed), and thus can be manufactured in a lightweight and thin form. In addition, the light emitting display apparatus is not only advantageous in terms of power consumption because it is driven at a low voltage, but also excellent in color implementation, response speed, viewing angle, and contrast ratio CR. Accordingly, the light emitting display apparatus is being studied as a next-generation display.

The light emitting display apparatus is a display apparatus capable of emitting light by itself. The light emitting display apparatus uses a light emitting diode that emits light when excitons fall from an excited state to a ground state, the excitons being generated by injecting electrons and holes into a light emitting part from a cathode for injecting electrons and an anode for injecting holes, respectively, such that the injected electrons and holes are combined with each other.

The light emitting display apparatus may be classified as a top emission type, a bottom emission type, a dual emission type, or the like, depending on a direction in which the light is emitted. Also, the light emitting display apparatus may be classified as a passive matrix type, an active matrix type, or the like, depending on a driving method.

SUMMARY OF THE DISCLOSURE

In a display apparatus, a high-potential voltage is supplied to a plurality of pixels through power wirings extending to a display area from power supply wirings disposed in a non-display area. However, in accordance with the high resolution of the display apparatus, the display apparatus can have a reduced space for the power wirings in the display area, which can result in a limitation that a width of each power wiring has decreased. Also, in accordance with the large size of the display apparatus, a length of each power wiring can be increased.

In addition, in accordance with the high resolution of the light emitting display apparatus, a pentile-structure pixel arrangement method has been introduced. However, in the pentile-structure pixel arrangement, when designing an additional wiring in the display area, the additional wiring needs to avoid pre-existing power wirings and anodes, which can result in a limitation that the length of the additional wiring may increase, thereby causing an increase in resistance of the additional wiring. Further, there has been another limitation that no process margin may remain between the additional wiring and the power wirings and anodes, and as a result, there may be a region in which another additional wiring cannot be designed.

The inventor of the present disclosure has recognized that an organic light emitting display apparatus including a touch screen has a space for designing a wiring in a non-display area of a touch part. Accordingly, the inventor of the present disclosure has invented a new-structure light emitting display apparatus to address the limitations of the conventional light emitting display apparatus, e.g., a voltage drop caused by a high-potential voltage and non-uniformity of brightness resulting from the voltage drop.

An aspect of the present disclosure is to provide a light emitting display apparatus capable of minimizing a voltage drop caused by a high-potential voltage by disposing a wiring in a power supply wiring part of a touch part.

Another aspect of the present disclosure is to provide a light emitting display apparatus having improved brightness uniformity.

Additional features and aspects will be set forth in part in the description that follows, and in part will become apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

According to an aspect of the present disclosure, a light emitting display apparatus includes a substrate including a display area and a non-display area positioned outside the display area and having a power supply wiring part; a first power supply wiring disposed in the power supply wiring part; a second power supply wiring disposed on the first power supply wiring; and a wiring electrically connected to the second power supply wiring.

According to another aspect of the present disclosure, a light emitting display apparatus includes a substrate including a display area and a power supply wiring part disposed outside the display area; a thin film transistor disposed in the display area and including a source electrode and a drain electrode; a touch unit disposed on the thin film transistor; a first power supply wiring disposed in the power supply wiring part; a second power supply wiring disposed on the first power supply wiring; and a wiring disposed on the second power supply wiring and electrically connected to the second power supply wiring.

According to some embodiments of the present disclosure, the voltage drop of the light emitting display apparatus can be reduced by disposing an additional wiring connected to the power wirings in an empty area of the touch part.

According to some embodiments of the present disclosure, the brightness uniformity of the light emitting display apparatus can be improved by supplying a uniform high-potential voltage to all of the plurality of pixels.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description of the present disclosure are explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

DETAILED DESCRIPTION OF THE EMBODIMENTS

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and can be changed as is known in the art, with the exception of steps and/or operations necessarily occurring in a particular order. Like reference numerals designate like elements throughout. Names of the respective elements used in the following explanations are selected only for convenience of writing the specification and can be thus different from those used in actual products.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only." Any references to singular can include plural unless expressly stated otherwise.

Components are interpreted to include an ordinary error range even if not expressly stated.

When the position relation between two parts is described using the terms such as "over," "on," "above," "below," and "next," one or more parts can be positioned between the two parts unless the terms are used with the term "immediately" or "directly." Further, the phrases such as 'disposed on', 'disposed over', and 'disposed above' can be interchangeably used.

When an element or layer is disposed "on" another element or layer, another layer or another element can be interposed directly on the other element or therebetween.

Although the terms "first," "second," and the like are used for describing various components, these components are not confined by these terms. These terms are merely used for distinguishing one component from the other components and may not define order. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a light emitting display apparatus according to example embodiments of the present disclosure will be described in detail with reference to accompanying drawings.

Figure 1:
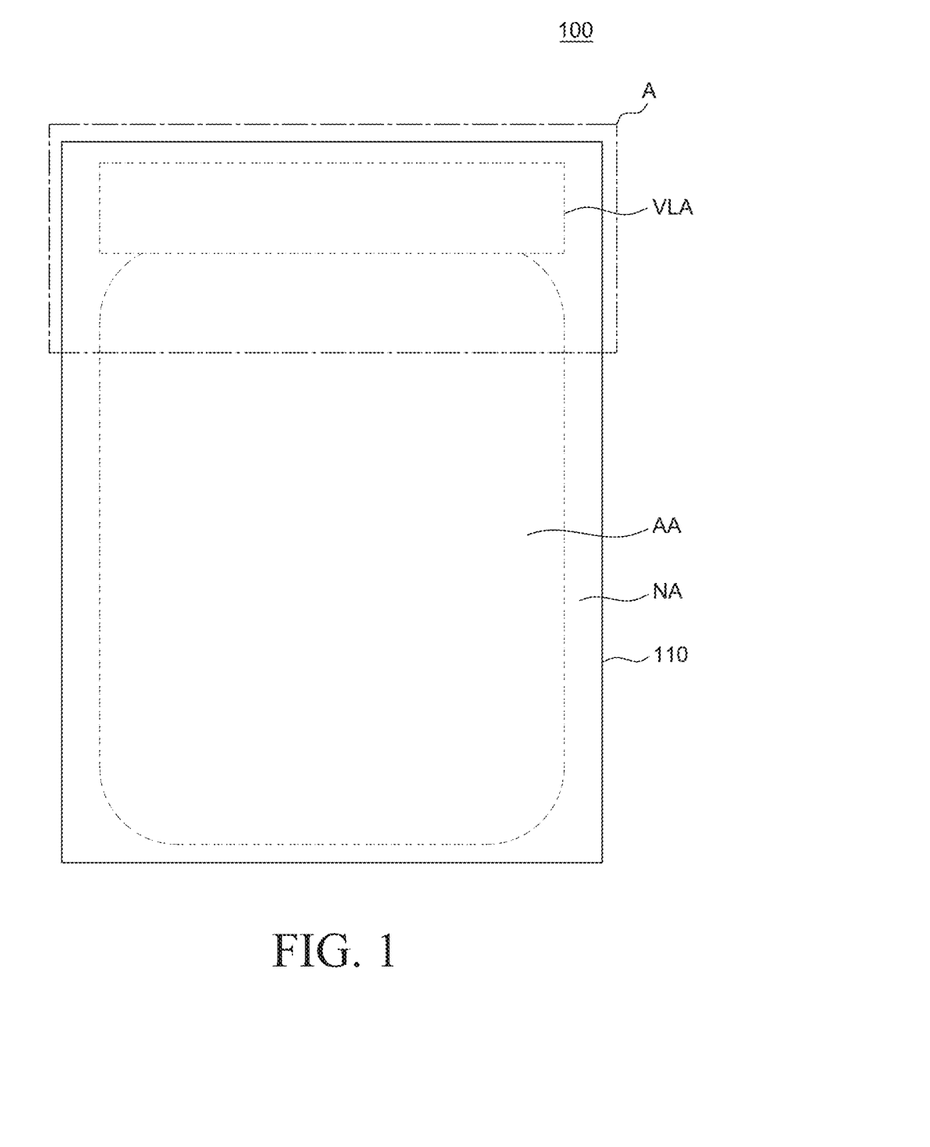
FIG. 1 is a plan view of a light emitting display apparatus according to an embodiment of the present disclosure.
Figure 2:
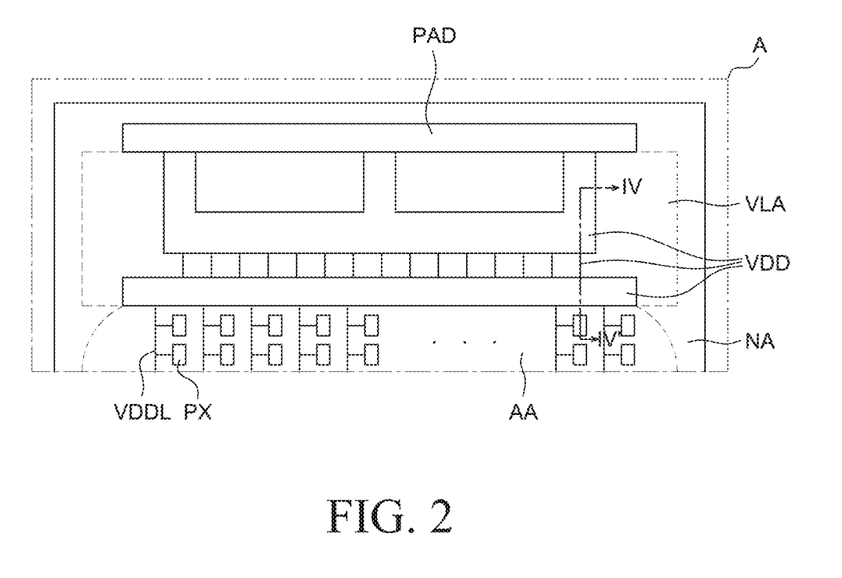
FIG. 2 is an enlarged view of area A of FIG. 1 according to an embodiment of the present disclosure.

FIG. 1 is a plan view of a light emitting display apparatus according to one embodiment of the present disclosure. FIG. 2 is an enlarged view of area A of FIG. 1. All the components of each light emitting display apparatus according to all embodiments of the present disclosure are operatively coupled and configured.

In FIGS. 1 and 2, a substrate 110, pixels PX, a power supply wiring part VDD, power wirings VDDL, and a pad part PAD are illustrated, among various components of the light emitting display apparatus 100, for convenience of description.

The substrate 110 can be a substrate 110 configured to support and protect the various components of the light emitting display apparatus 100. The substrate 110 can be formed of glass or a plastic material having flexibility (e.g., a flexible substrate). When the substrate 110 is formed of a plastic material, the plastic material can be, for example, polyimide PI, but embodiments of the present disclosure are not limited thereto.

The substrate 110 can include a display area AA and a non-display area NA surrounding the display area AA.

The display area AA can be an area in which an image is displayed in the light emitting display apparatus 100. In the display area AA, a display element and various driving elements configured to drive the display element can be disposed. For example, the display element can be a light emitting diode including an anode, a light emitting layer, and a cathode, but embodiments of the present disclosure are not limited thereto. The display element can be a liquid crystal display element. In addition, various driving elements for driving the display element, such as a thin film transistor, a capacitor, and a wiring, can be disposed at the display area AA. The display area AA will be described in more detail below with reference to FIG. 4

A plurality of pixels PX are disposed at the display area AA. The plurality of pixels PX can include a plurality of sub-pixels, respectively. For example, the plurality of pixels PX can include a red sub-pixel, a green sub-pixel, and a blue sub-pixel and can be minimum units for emitting light. In addition, the plurality of pixels PX can further include a white sub-pixel. With reference to FIG. 2, the plurality of pixels PX can be connected to the power wirings VDDL. Also, each of the plurality of pixels PX at the display area AA can be connected to a gate wiring and a data wiring.

The non-display area NA can be an area in which an image is not displayed, and can be defined as an area surrounding the display area AA. In the non-display area NA, various components configured to drive the plurality of pixels PX can be disposed.

The non-display area NA can include a power supply wiring area VLA. The power supply wiring area VLA can be an area in which wirings for supplying power to the light emitting diodes are disposed. The power supply wiring area VLA can be disposed adjacent to one side of the display area AA. That is, the power supply wiring area VLA can be an area positioned between the pad part PAD, to which a flexible printed circuit board FPCB is bonded, and the display area AA, such that power wirings are disposed therein to transmit power from the flexible printed circuit board FPCB to the light emitting diodes of the display area AA. In FIG. 2, the power supply wiring part VDD configured to supply a high-potential voltage is illustrated, among various wirings, for convenience of description, but the arrangement of the power wirings is not limited thereto.

With reference to FIG. 2, the power supply wiring part VDD can be disposed at the power supply wiring area VLA, which is a partial portion of the non-display area NA. The power supply wiring part VDD can be disposed adjacent to an upper end (or an upper portion) of the display area AA. The power supply wiring part VDD, which is a wiring part configured to supply a high-potential voltage to each of the pixels PX in the display area AA, can be connected to each of the plurality of power wirings VDDL. The power supply wiring part VDD can include one or more power supply wirings. The power supply wirings constituting the power supply wiring part VDD will be described below with reference to FIG. 4.

The power supply wiring part VDD can extend in the same direction as the direction in which the gate wirings disposed in the display area AA extend. Also, the power supply wiring part VDD can be connected to the plurality of power wirings VDDL through connection wirings from the non-display area NA. In this situation, the connection wiring can have a smaller width than the power supply wiring part VDD, but embodiments of the present disclosure are not limited thereto.

With reference to FIG. 2, the power supply wiring part VDD can be connected to the plurality of power wirings VDDL. The plurality of power wirings VDDL can be disposed at the display area AA to supply a high-potential voltage to the plurality of pixels PX. Each of the plurality of power wirings VDDL can be connected to the power supply wiring part VDD. Accordingly, each of the plurality of power wirings VDDL can receive the same high-potential voltage from the power supply wiring part VDD at the same time.

Figure 3:
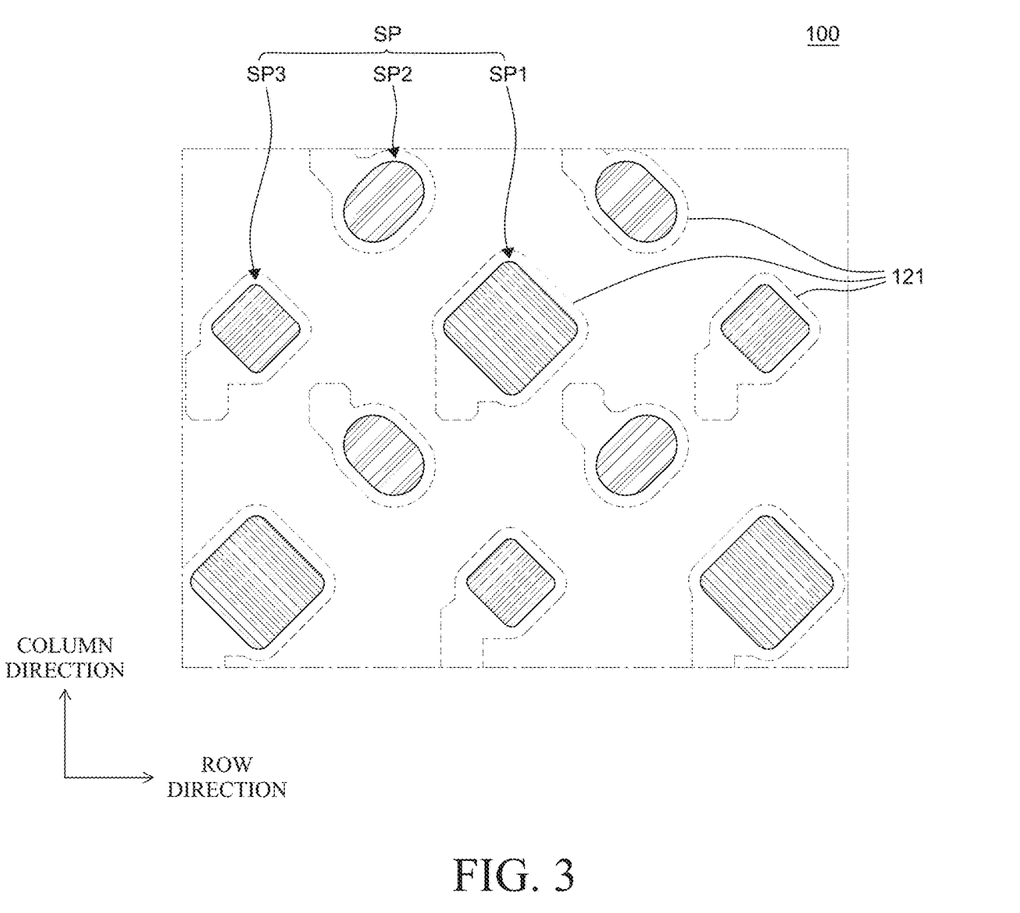
FIG. 3 is an enlarged plan view of the light emitting display apparatus according to an embodiment of the present disclosure.

FIG. 3 is an enlarged plan view of the light emitting display apparatus according to one embodiment of the present disclosure. In FIG. 3, the anode 121 is illustrated among various components of the light emitting diode 120.

With reference to FIG. 3, a plurality of sub-pixels SP can be individual units configured to emit light, and the light emitting diode 120 can be disposed at each of the plurality of sub-pixels SP. The plurality of sub-pixels SP can include a first sub-pixel SP1, a second sub-pixel SP2, and a third sub-pixel SP3 that emit light in different colors from each other. For example, the first sub-pixel SP1 can be a blue sub-pixel, the second sub-pixel SP2 can be a green sub-pixel, and the third sub-pixel SP3 can be a red sub-pixel.

The plurality of sub-pixels SP can be disposed in a pentile structure. For example, a plurality of first sub-pixels SP1 and a plurality of third sub-pixels SP3 can be alternately disposed in the same columns and in the same rows. For example, the first sub-pixels SP1 and the third sub-pixels SP3 can be alternately disposed in the same columns, and the first sub-pixels SP1 and the third sub-pixels SP3 can be alternately disposed in the same rows.

The plurality of second sub-pixels SP2 can be disposed in different columns and in different rows from the plurality of first sub-pixels SP1 and the plurality of third sub-pixels SP3. For example, the plurality of second sub-pixels SP2 can be disposed in one row, and the plurality of first sub-pixels SP1 and the plurality of third sub-pixels SP3 can be alternately disposed in another row adjacent to the row in which the plurality of second sub-pixels SP2 is disposed. The plurality of second sub-pixels SP2 can be disposed in one column, and the plurality of first sub-pixels SP1 and the plurality of third sub-pixels SP3 can be alternately disposed in another column adjacent to the column in which the plurality of second sub-pixels SP2 is disposed. The plurality of first sub-pixels SP1 and the plurality of second sub-pixels SP2 can face each other in a diagonal direction, and the plurality of third sub-pixels SP3 and the plurality of second sub-pixels SP2 can also face each other in the diagonal direction. Accordingly, the plurality of sub-pixels SP can be disposed in a lattice shape.

Although it is illustrated in FIG. 3 that the plurality of first sub-pixels SP1 and the plurality of third sub-pixels SP3 can be disposed in the same columns and in the same rows, and the plurality of second sub-pixels SP2 can be disposed in different columns and in different rows from the plurality of first sub-pixels SP1 and the plurality of third sub-pixels SP3, the disposition of the plurality of sub-pixels SP is not limited thereto.

In addition, although it is described in the present disclosure that the plurality of sub-pixels SP includes first sub-pixels SP1, second sub-pixels SP2, and third sub-pixels SP3, the arrangement, the number, and the color combination of the plurality of sub-pixels SP can be variously modified according to design, but embodiments of the present disclosure are not limited thereto.

Figure 4:
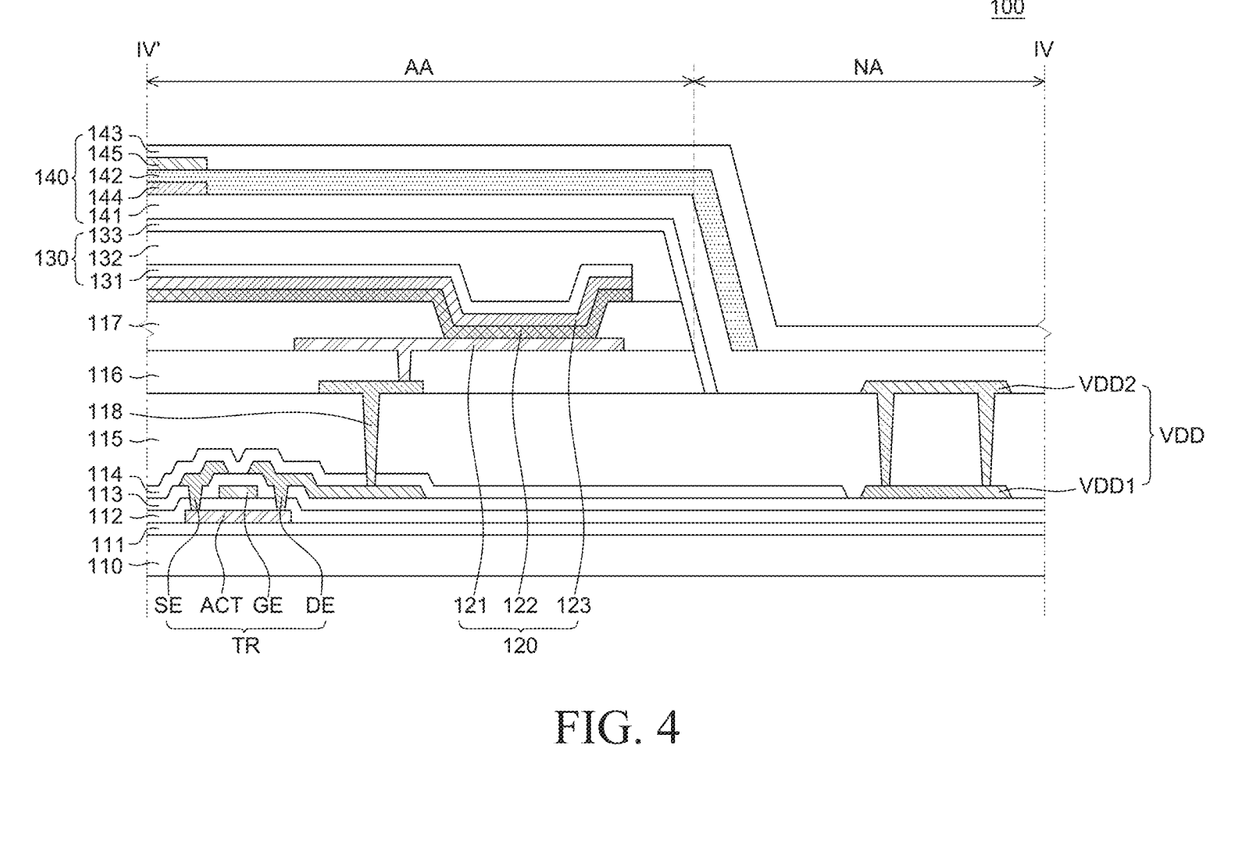
FIG. 4 is a cross-sectional view of the light emitting display apparatus taken along line IV-IV' of FIG. 2 according to an embodiment of the present disclosure.

FIG. 4 is a cross-sectional view of the light emitting display apparatus taken along line IV-IV' of FIG. 2.

With reference to FIG. 4, the light emitting display apparatus 100 according to an embodiment of the present disclosure includes a substrate 110, a buffer layer 111, a gate insulating layer 112, an interlayer insulating layer 113, a passivation layer 114, a first over-coating layer 115, a second over-coating layer 116, a bank 117, a driving transistor TR, a light emitting diode 120, an encapsulation part 130, a touch part 140, and a power supply wiring part VDD.

With reference to FIG. 4, the substrate 110 is a support member configured to support the other components of the light emitting display apparatus 100, and can be formed of an insulating material. For example, the substrate 110 can be formed of glass, resin, or the like. Alternatively, the substrate 110 can be formed of a polymer or plastic such as polyimide PI, or can be formed of a material having flexibility.

The buffer layer 111 is disposed on the display area AA and the non-display area NA of the substrate 110. The buffer layer 111 can reduce or prevent permeation of moisture or impurities through the substrate 110. The buffer layer 111 can be formed as a single-layer or a multi-layer of, for example, silicon oxide SiOx or silicon nitride SiNx, but embodiments of the present disclosure are not limited thereto. Meanwhile, the buffer layer 111 can be omitted according to the type of substrate 110 or the type of transistor, but embodiments of the present disclosure are not limited thereto.

The driving transistor TR is disposed on the buffer layer 111. The driving transistor TR includes an active layer ACT, a gate electrode GE, a source electrode SE, and a drain electrode DE.

The active layer ACT is disposed on the buffer layer 111. The active layer ACT can be formed of a semiconductor material such as an oxide semiconductor, amorphous silicon, or polysilicon, but embodiments of the present disclosure are not limited thereto. For example, when the active layer ACT is formed of an oxide semiconductor, the active layer ACT can include a channel region, a source region, and a drain region, the source region and the drain region being conductive regions, but embodiments of the present disclosure are not limited thereto.

The gate insulating layer 112 can be disposed on the active layer ACT. The gate insulating layer 112 can be an insulating layer for insulating the gate electrode GE from the active layer ACT, and can be formed as a single-layer or a multi-layer of silicon oxide SiOx or silicon nitride SiNx, but embodiments of the present disclosure are not limited thereto.

The gate electrode GE can be disposed on the gate insulating layer 112. The gate electrode GE can be formed of a conductive material, for example, copper Cu, aluminum Al, molybdenum Mo, nickel Ni, titanium Ti, chromium Cr, or an alloy thereof, but embodiments of the present disclosure are not limited thereto.

The interlayer insulating layer 113 can be disposed on the gate electrode GE. A contact hole can be formed at the interlayer insulating layer 113 to connect each of the source electrode SE and the drain electrode DE to the active layer ACT. The interlayer insulating layer 113 can be formed as a single-layer or a multi-layer of silicon oxide SiOx or silicon nitride SiNx, but embodiments of the present disclosure are not limited thereto.

The source electrode SE and the drain electrode DE can be disposed on the interlayer insulating layer 113 at the display area AA. The source electrode SE and the drain electrode DE disposed to be spaced apart from each other can be electrically connected to the active layer ACT. The source electrode SE and the drain electrode DE can be formed of a conductive material, for example, copper Cu, aluminum Al, molybdenum Mo, nickel Ni, titanium Ti, chromium Cr, or an alloy thereof, but embodiments of the present disclosure are not limited thereto.

The passivation layer 114 can be disposed at the display area AA and the non-display area NA and on the source electrode SE and the drain electrode DE. The passivation layer 114 can be an insulating layer for protecting the components disposed lower than the passivation layer 114. For example, the passivation layer 114 can be formed as a single-layer or a multi-layer of silicon oxide SiOx or silicon nitride SiNx, but embodiments of the present disclosure are not limited thereto. In addition, the passivation layer 114 can be omitted in some embodiments of the present disclosure.

The first over-coating layer 115 can be disposed on the passivation layer 114. The first over-coating layer 115 can be an insulating layer for planarization over the substrate 110. The first over-coating layer 115 can be formed of an organic material, and can be formed as a single-layer or a multi-layer of, for example, polyimide or photo acryl, but embodiments of the present disclosure are not limited thereto.

An intermediate electrode 118 can be disposed on the first over-coating layer 115 at the display area AA. The intermediate electrode 118 can be electrically connected to the drain electrode DE through a contact hole. The intermediate electrode 118 can be formed of the same material as either the source electrode SE or the drain electrode DE, but embodiments of the present disclosure are not limited thereto.

The second over-coating layer 116 can be disposed in the display area AA and on the intermediate electrode 118. The second over-coating layer 116 can be provided for planarization over the intermediate electrode 118. The second over-coating layer 116 can be formed of the same material as the first over-coating layer 115, but embodiments of the present disclosure are not limited thereto.

With reference to FIGS. 3 and 4 together, the plurality of the light emitting diodes 120 can be disposed at the plurality of sub-pixels SP, respectively, on the second over-coating layer 116 at the display area AA. The light emitting diode 120 can include an anode 121, a light emitting layer 122, and a cathode 123.

The anode 121 can be disposed on the second over-coating layer 116. The anode 121 can be electrically connected to a transistor of a pixel circuit, for example, the driving transistor TR, to receive a driving current supplied therefrom. The anode 121, which supplies holes to the light emitting layer 122, can be formed of a conductive material having a high work function. The anode 121 can be formed of, for example, a transparent conductive material such as indium tin oxide ITO or indium zinc oxide IZO, but embodiments of the present disclosure are not limited thereto.

In addition, the light emitting display apparatus 100 can be implemented in a top emission type or in a bottom emission type. When the light emitting display apparatus 100 is in the top emission type, a reflective layer can be additionally included under the anode 121, the reflective layer being formed of a metal material having excellent reflection efficiency, such as aluminum (Al) or silver (Ag), so that light emitted from the light emitting layer 122 is reflected by the anode 121 and then directed upwardly, for example, toward the cathode 123. On the other hand, when the light emitting display apparatus 100 is in the bottom emission type, the anode 121 can be formed of the transparent conductive material alone. Hereinafter, it is assumed that the light emitting display apparatus 100 according to an embodiment of the present disclosure is in the top emission type.

The bank 117 can be disposed on the anode 121 and the second over-coating layer 116. The bank 117 can be an insulating layer disposed between the plurality of sub-pixels SP to distinguish the plurality of sub-pixels SP from each other. The bank 117 can include an opening for exposing a partial portion of the anode 121. The bank 117 can be an organic insulating material disposed to cover an edge or a perimeter or a periphery portion of the anode 121. The bank 117 can be formed of, for example, polyimide-based, acrylic-based, or benzocyclobutene (BCB)-based resin, but embodiments of the present disclosure are not limited thereto.

The light emitting layer 122 can be disposed on the anode 121 and over the bank 117. The light emitting layer 122 can be a layer for emitting light in a specific color. Different light emitting layers 122 can be disposed in the first sub-pixel SP1, the second sub-pixel SP2, and the third sub-pixel SP3, respectively, or identical light emitting layers 122 can be disposed in all of the plurality of sub-pixels SP. For example, when different light emitting layers 122 are disposed in the plurality of sub-pixels SP, respectively, a blue light emitting layer can be disposed in the first sub-pixel SP1, a green light emitting layer can be disposed in the second sub-pixel SP2, and a red light emitting layer can be disposed in the third sub-pixel SP3.

Alternatively, the light emitting layers 122 of the plurality of sub-pixels SP can be connected to each other to form a single layer over the plurality of sub-pixels SP. For example, a light emitting layer 122 can be disposed on all of the plurality of sub-pixels SP, and light from the light emitting layer 122 can be converted into light with various colors through a light conversion layer, a color filter, or the like, which is separately provided.

The cathode 123 can be disposed on the light emitting layer 122. The cathode 123, which supplies electrons to the light emitting layer 122, can be formed of a conductive material having a low work function. The cathode 123 can be formed as a single layer over the plurality of sub-pixels SP. For example, the respective cathodes 123 of the plurality of sub-pixels SP can be connected to each other to be integrally formed. The cathode 123 can be formed of, for example, a transparent conductive material such as indium tin oxide ITO or indium zinc oxide IZO, a metal alloy such as MgAg, or a ytterbium Yb alloy, and can further include a metal-doped layer, but embodiments of the present disclosure are not limited thereto. Also, the cathode 123 can be electrically connected to a low-potential power supply wiring to receive a low-potential power supply signal supplied therefrom.

With reference to FIG. 4, the encapsulation part 130 can be disposed on the light emitting diode 120. For example, the encapsulation part 130 can be disposed on the cathode 123 to cover the light emitting diode 120. The encapsulation part 130 can protect the light emitting diode 120 from moisture or the like permeating from the outside of the light emitting display apparatus 100. The encapsulation part 130 can include a first encapsulation layer 131, a foreign material cover layer 132, and a second encapsulation layer 133.

The first encapsulation layer 131 can be disposed on the cathode 123 to suppress or prevent permeation of moisture or oxygen. The first encapsulation layer 131 can be formed of an inorganic material such as silicon nitride SiNx, silicon oxynitride SiNxOy, or aluminum oxide AlyOz, but embodiments of the present disclosure are not limited thereto.

The foreign material cover layer 132 can be disposed on the first encapsulation layer 131 to planarize a surface. In addition, the foreign material cover layer 132 can cover foreign materials or particles that can occur in the manufacturing process. The foreign material cover layer 132 can be formed of an organic material such as silicon oxycarbon (SiOxCz) or acrylic-based or epoxy-based resin, but embodiments of the present disclosure are not limited thereto.

The second encapsulation layer 133 can be disposed on the foreign material cover layer 132. The second encapsulation layer 133 can be disposed to cover a top surface (or an upper surface) and a side surface of the foreign material cover layer 132, a side surface of the bank 117, and a side surface of the second over-coating layer 116. Like the first encapsulation layer 131, the second encapsulation layer 133 can suppress or prevent permeation of moisture or oxygen. The second encapsulation layer 133 can be formed of an inorganic material such as silicon nitride SiNx, silicon oxynitride SiNxOy, silicon oxide SiOx, or aluminum oxide AlyOz, but embodiments of the present disclosure are not limited thereto. The second encapsulation layer 133 can be formed of the same material as the first encapsulation layer 131, or can be formed of a different material than the first encapsulation layer 131.

A first power supply wiring VDD1 can be disposed on the interlayer insulating layer 113 at the non-display area NA. The first power supply wiring VDD1 can be electrically connected to the driving transistor TR. Accordingly, the first power supply wiring VDD1 supplies a voltage to the driving transistor TR to operate the driving transistor TR. The first power supply wiring VDD1 can be formed of the same material as the drain electrode DE, but embodiments of the present disclosure are not limited thereto.

A second power supply wiring VDD2 can be disposed on the first over-coating layer 115 at the non-display area NA. The second power supply wiring VDD2 disposed on the first power supply wiring VDD1 can be electrically connected in parallel to the first power supply wiring VDD1 through a contact hole. The second power supply wiring VDD2 can be formed of the same material as the intermediate electrode 118, but embodiments of the present disclosure are not limited thereto.

With reference to FIG. 4, the touch part 140 can be disposed on the second encapsulation layer 133 at the display area AA. The touch part 140 can be disposed on the first over-coating layer 115 and the second power supply wiring VDD2 at the non-display area NA. The touch part 140 can include a first inorganic insulating layer 141, a first touch part 144, a second inorganic insulating layer 142, a second touch part 145, and an organic insulating layer 143.

The first inorganic insulating layer 141 can be disposed on the second encapsulation layer 133 at the display area AA and on the first over-coating layer 115 and the second power supply wiring VDD2 at the non-display area NA. The first inorganic insulating layer 141 can be disposed to contact a top surface (or an upper surface) and a side surface of the second encapsulation layer 133 at the display area AA and cover the first over-coating layer 115 and the second power supply wiring VDD2 at the non-display area NA. The first inorganic insulating layer 141 can be formed of an inorganic material, such as silicon nitride SiNx, silicon oxide SiOx, or silicon oxynitride SiON, but embodiments of the present disclosure are not limited thereto.

The first touch part 144 can be disposed on the first inorganic insulating layer 141. The first touch part 144 can be disposed in the display area AA on the first inorganic insulating layer 141. The first touch part 144 can include a plurality of patterns disposed to be spaced apart from each other in an X-axis direction and a plurality of patterns disposed to be spaced apart from each other in a Y-axis direction. The first touch part 144 supplies a touch driving signal for driving the touch part 140. In addition, the first touch part 144 can transmit touch information sensed by the touch part 140 to a driving IC. The first touch part 144 can be formed in a mesh shape, but embodiments of the present disclosure are not limited thereto. The first touch part 144 can be formed of the same material as the source electrode SE or the drain electrode DE of the driving transistor TR, but embodiments of the present disclosure are not limited thereto.

The second inorganic insulating layer 142 can be disposed on the first touch part 144 and the first inorganic insulating layer 141. The second inorganic insulating layer 142 can suppress a short circuit of the first touch part 144 disposed adjacent thereto. The second inorganic insulating layer 142 can be formed of an inorganic material, such as silicon nitride SiNx, silicon oxide SiOx, or silicon oxynitride SiON, but embodiments of the present disclosure are not limited thereto.

The second touch part 145 can be disposed on the second inorganic insulating layer 142. The second touch part 145 can connect the plurality of patterns disposed to be spaced apart from each other in the X-axis direction to each other, or can connect the plurality of patterns disposed to be spaced apart from each other in the Y-axis direction to each other. Since the plurality of patterns disposed in the X-axis direction and the plurality of patterns disposed in the Y-axis direction included in the first touch part 144 are disposed on the same plane, the plurality of patterns disposed in the X-axis direction or the plurality of patterns disposed in the Y-axis direction are spaced apart and separated from each other at sections where the plurality of patterns disposed in the X-axis direction and the plurality of patterns disposed in the Y-axis direction intersect each other. Accordingly, the second touch part 145 can connect the plurality of patterns disposed to be spaced apart from each other in the X-axis direction to each other, or can connect the plurality of patterns disposed to be spaced apart from each other in the Y-axis direction to each other.

The organic insulating layer 143 can be disposed on the first inorganic insulating layer 141, the second touch part 145, and the second inorganic insulating layer 142. The organic insulating layer 143 can be provided for planarization over the second touch part 145 and protect the components disposed lower than the organic insulating layer 143. The organic insulating layer 143 can be formed of an epoxy-based or acrylic-based polymer, but embodiments of the present disclosure are not limited thereto.

In addition, a polarizing plate can be further disposed on the touch part 140. The polarizing plate can be disposed on the touch part 140 to reduce reflection of external light incident on the light emitting display apparatus 100. In addition, various optical films or protective films can be further disposed on the touch part 140.

In the light emitting display apparatus 100 according to an embodiment of the present disclosure, a voltage drop can be reduced by using the first power supply wiring VDD1 and the second power supply wiring VDD2 included in the power supply wiring part VDD. For example, the first power supply wiring VDD1 and the second power supply wiring VDD2 can be disposed in the power supply wiring area VLA of the non-display area NA and electrically connected in parallel to each other through a contact hole. Accordingly, the power supply wiring part VDD can more stably supply a high-potential voltage to the plurality of power wirings VDDL, thereby reducing a voltage drop in the plurality of power wirings VDDL and improving a brightness uniformity of the light emitting display apparatus 100.

Figure 5:
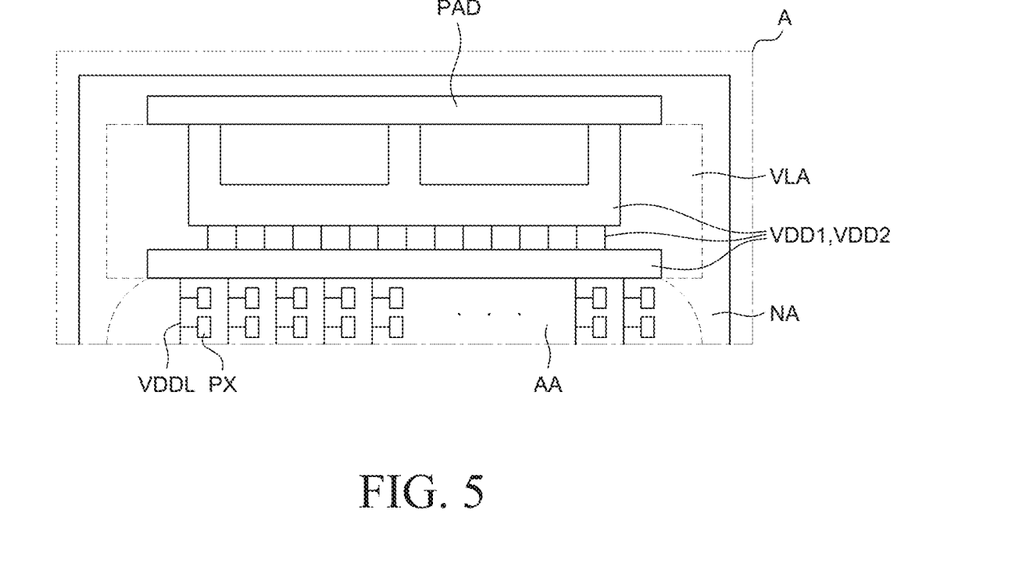
FIGS. 5 and 6 are enlarged views of a light emitting display apparatus according to another embodiment of the present disclosure.
Figure 6:
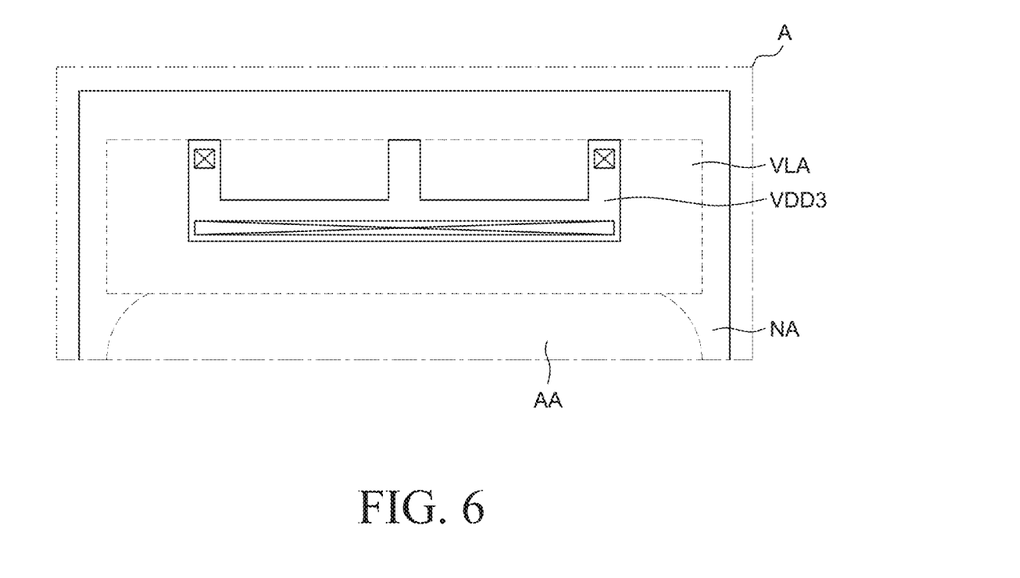
Figure 7:
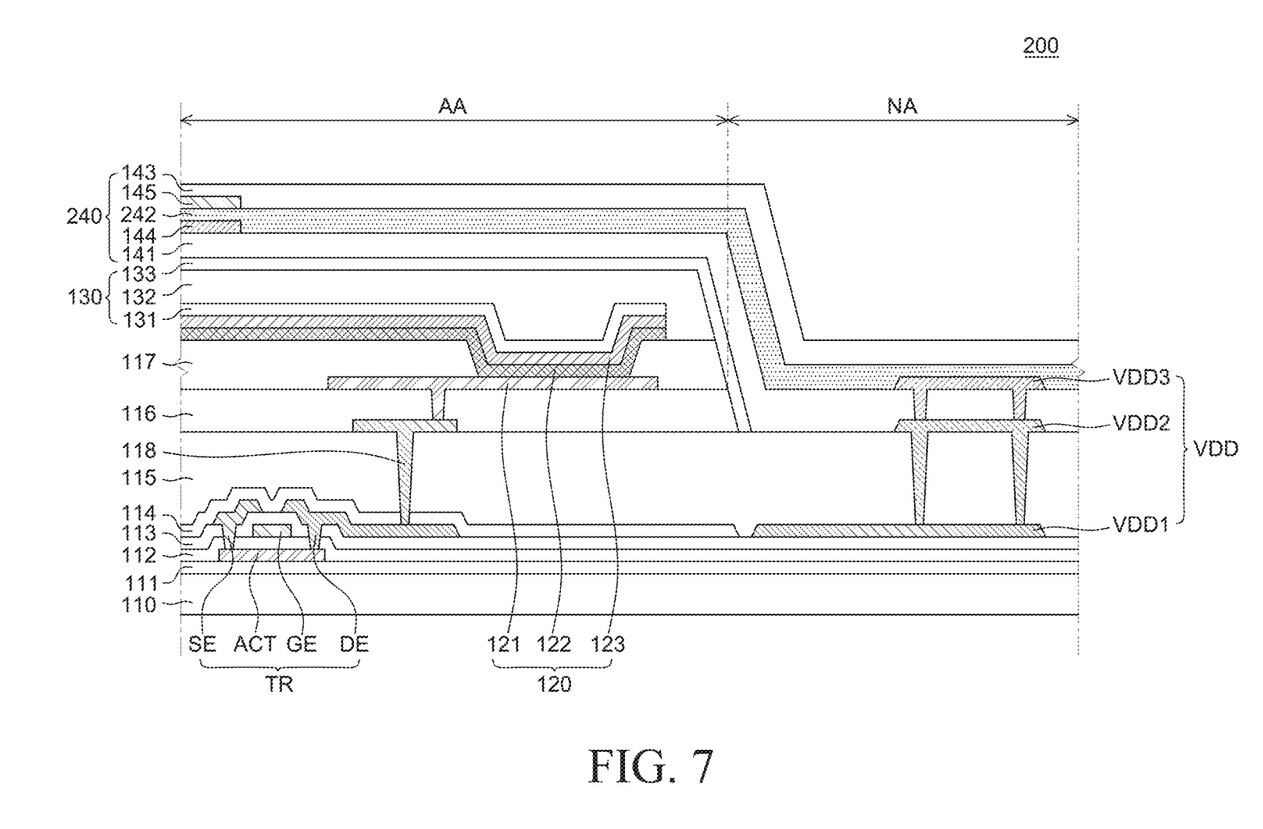
FIG. 7 is a cross-sectional view of the light emitting display apparatus according to another embodiment of the present disclosure.

FIGS. 5 and 6 are enlarged views of a light emitting display apparatus according to another embodiment of the present disclosure. FIG. 7 is a cross-sectional view of the light emitting display apparatus according to another embodiment of the present disclosure. As compared with the light emitting display apparatus 100 of FIGS. 1 to 4, the light emitting display apparatus 200 of FIGS. 5 to 7 substantially has the same configuration, while being different only in a power supply wiring part VDD and a touch part 240. Thus, the overlapping description for the same components will be omitted. FIG. 5 is a diagram for explaining a first power supply wiring VDD1 and a second power supply wiring VDD2 of the power supply wiring part VDD, and FIG. 6 is a diagram for explaining a third power supply wiring VDD3 of the power supply wiring unit VDD. For convenience of description, components other than the power supply wiring part VDD are schematically illustrated or omitted in FIGS. 5 and 6.

With reference to FIG. 5, the first power supply wiring VDD1 and the second power supply wiring VDD2 of the power supply wiring part VDD can be disposed in the power supply wiring area VLA, which is a partial portion of the non-display area NA. The first power supply wiring VDD1 and the second power supply wiring VDD2 can be disposed adjacent to an upper end of the display area AA. The first power supply wiring VDD1 and the second power supply wiring VDD2, which are wirings for supplying a high-potential voltage to each of the pixels PX in the display area AA, can be connected to each of the plurality of power wirings VDDL.

The first power supply wiring VDD1 and the second power supply wiring VDD2 can include a first portion directly connected to the pad part PAD, a second portion directly connected to the plurality of power wirings VDDL, and a third portion connecting the first portion and the second portion to each other. As illustrated in FIG. 5, the first portion (e.g., three vertical branches in FIG. 5) can include a plurality of branch-shaped portions directly connected to the pad part PAD and a straight line-shaped portion (e.g., horizontal bar shaped portion in FIG. 5) to which the plurality of branch-shaped portions are connected (e.g., together forming a trident shape or a letter "E" shape rotated 270 degrees). Also, the pad part PAD and the first portion of the first power supply wiring VDD1 and the second power supply wiring VDD2 can form a letter "B" shape rotated 270 degrees. As illustrated in FIG. 5, the second portion can have a straight line shape (e.g., the lower horizontal bar shaped portion in FIG. 5). In addition, the third portion (e.g., the fifteen vertical wire segments in FIG. 5) can include a plurality of wirings connecting the first portion and the second portion to each other. Also, the straight line-shaped portion of the first portion can be shorter than the straight line shape of the second portion, and the straight line shape of the second portion can be thicker than the straight line-shaped portion of the first portion. However, the shapes of the first portion, the second portion, and the third portion are not limited thereto.

With reference to FIG. 6, the third power supply wiring VDD3 of the power supply wiring part VDD can be disposed at the power supply wiring area VLA, which is a partial portion of the non-display area NA. The third power supply wiring VDD3 can be disposed adjacent to the upper end of the display area AA.

The third power supply wiring VDD3 can be disposed to overlap the first portion of the first power supply wiring VDD1 and the second power supply wiring VDD2. In addition, the third power supply wiring VDD3 can have the same shape as the first portion of the first power supply wiring VDD1 and the second power supply wiring VDD2. For example, taken together, the third power supply wiring VDD3 and the first portion of the first power supply wiring VDD1 and the second power supply wiring VDD2 can form a triple layered trident head shape.

The third power supply wiring VDD3 can be electrically connected in parallel to the first power supply wiring VDD1 and the second power supply wiring VDD2. This will be described in more detail with reference to FIG. 7. With reference to FIG. 7, the third power supply wiring VDD3 can be disposed on the first inorganic insulating layer 141. The third power supply wiring VDD3 can be disposed at the non-display area NA on the first inorganic insulating layer 141. The third power supply wiring VDD3 can be electrically connected to the second power supply wiring VDD2 through a contact hole. Accordingly, the third power supply wiring VDD3 can be electrically connected in parallel to the first power supply wiring VDD1 and the second power supply wiring VDD2. The third power supply wiring VDD3 can be formed of the same material on the same layer as the first touch part 144, but embodiments of the present disclosure are not limited thereto.

The third power supply wiring VDD3 can have a larger thickness than the anode 121 of the light emitting diode 120. For example, the anode has a relatively smaller thickness as compared with the third power supply wiring VDD3. If the third power supply wiring VDD3 is formed of the same material at the same thickness as the anode 121, the third power supply wiring VDD3 can have an insufficient effect in reducing a total resistance of the power supply wiring part VDD. Thus, in the light emitting display apparatus 200 according to another embodiment of the present disclosure, the total resistance of the power supply wiring part VDD can be effectively reduced by forming the third power supply wiring VDD3 to have a larger thickness than the anode 121 of the light emitting diode 120.

A second inorganic insulating layer 242 of the touch part 240 can be disposed on the first touch part 144, the first inorganic insulating layer 141, and the third power supply wiring VDD3. The second inorganic insulating layer 242 can suppress or prevent a short circuit of the first touch part 144 disposed adjacent thereto. In addition, the second inorganic insulating layer 242 can be disposed to cover the third power supply wiring VDD3. The second inorganic insulating layer 242 can be formed of an inorganic material. For example, the second inorganic insulating layer 242 can be formed of an inorganic material such as silicon nitride SiNx, silicon oxide SiOx, or silicon oxynitride SiON, but embodiments of the present disclosure are not limited thereto.

Hereinafter, the effects and advantages of the light emitting display apparatus 200 according to another embodiment of the present disclosure will be described in more detail with reference to FIGS. 8 and 9 together.

Figure 8:
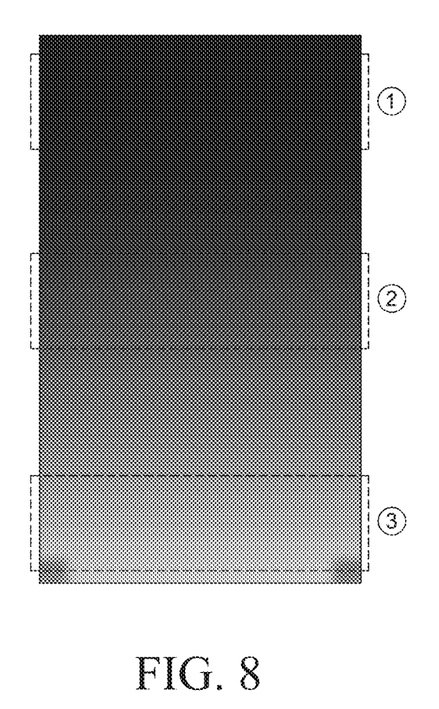
FIG. 8 is a diagram showing a voltage drop and a brightness uniformity in a light emitting display apparatus according to an experimental example.
Figure 9:
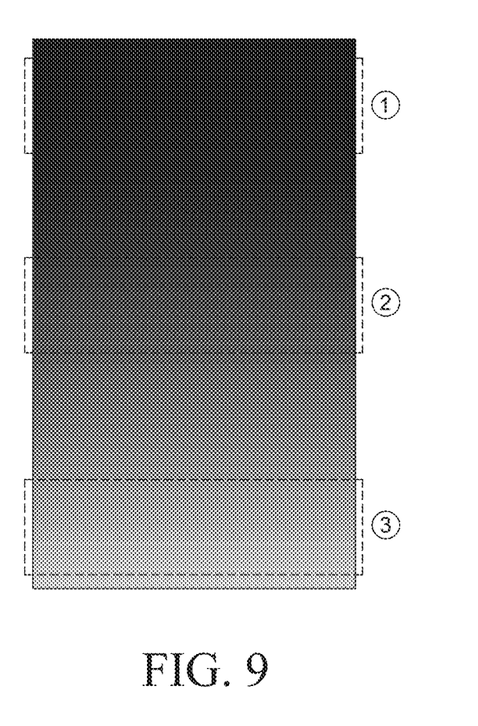
FIG. 9 is a diagram showing a voltage drop and a brightness uniformity in the light emitting display apparatus according to another embodiment of the present disclosure.

FIG. 8 is a diagram showing a voltage drop and a brightness uniformity in a light emitting display apparatus according to an experimental example, and FIG. 9 is a diagram showing a voltage drop and a brightness uniformity in the light emitting display apparatus according to another embodiment of the present disclosure.

First, referring to FIG. 8 and Table 1 below, it was confirmed in the light emitting display apparatus according to the experimental example that the voltage drop (IR Drop) occurred by 0.021 V at the top (①), by 0.042 V at the middle (②), and by 0.048 V at the bottom (③). In addition, it was confirmed in the light emitting display apparatus according to the experimental example that the brightness uniformity was 95.4%.

TABLE 1

| IR Drop (V) | | Uniformity |
| --- | --- | --- |
| Top (①) | 0.021 | 95.4% |
| Middle (②) | 0.042 | |
| Bottom (③) | 0.048 | |

In contrast, with reference to FIG. 9 and Table 2 below, it was confirmed in the light emitting display apparatus 200 according to another embodiment of the present disclosure that the voltage drop (IR Drop) occurred by 0.020 V at the top (①), by 0.040 V at the middle (②), and by 0.044 V at the bottom (③). In addition, it was confirmed in the light emitting display apparatus 200 according to another embodiment of the present disclosure that the brightness uniformity was 97.7%. That is, it was confirmed that the light emitting display apparatus 200 according to another embodiment of the present disclosure had a smaller voltage drop while having a larger brightness uniformity by about 2%, as compared to the organic light emitting display apparatus according to the experimental example.

TABLE 2

| IR Drop (V) | | Uniformity |
| --- | --- | --- |
| Top (①) | 0.020 | 97.7% |
| Middle (②) | 0.040 | |
| Bottom (③) | 0.044 | |

In the light emitting display apparatus according to the experimental example, wirings constituting a power supply wiring part having a two-stack or three-stack structure are additionally disposed in the display area. In this situation, the wirings can be formed in the same process as the anode electrodes of the light emitting diodes. However, the wirings are formed to have a relatively smaller thickness than the anode electrodes, resulting in a problem that the effect thereof is not sufficient in reducing a total resistance of the power supply wiring part.

In addition, in accordance with the high resolution of the light emitting display apparatus, a pentile-structure pixel arrangement method has been introduced. However, in the pentile-structure pixel arrangement, when designing an additional wiring in the display area, the additional wiring needs to avoid power wirings and anodes, resulting in a problem that the length of the additional wiring may increase, thereby causing an increase in resistance of the additional wiring. Further, there has been another problem that no process margin may remain between the additional wiring and the power wirings and anodes, and as a result, there may be a region in which another additional wiring cannot be designed.

In order to solve or address the problems, in the light emitting display apparatus 200 according to another embodiment of the present disclosure, a space in the power supply wiring area VLA of the non-display area NA of the touch part 240 allowing a wiring to be designed therein is utilized to reduce a voltage drop of the light emitting display apparatus 200. For example, the voltage drop of the light emitting display apparatus 200 can be reduced by disposing the third power supply wiring VDD3 formed of the same material as the first touch part 144 of the touch part 240 in the power supply wiring part VDD. The third power supply wiring VDD3 can be disposed at the non-display area NA of the touch part 140 and electrically connected in parallel to the first power supply wiring VDD1 and the second power supply wiring VDD2 through the contact hole. Accordingly, the power supply wiring part VDD can more stably supply a high-potential voltage to the plurality of power wirings VDDL, thereby reducing voltage drops in the plurality of power wirings VDDL. Therefore, the brightness uniformity of the light emitting display apparatus 200 can be improved according to the reduction in voltage drop of the plurality of power wirings VDDL, by disposing the third power supply wiring VDD3 in the power supply wiring part VDD.

A light emitting display apparatus according to one or more embodiments of the present disclosure will be described as follows.

A light emitting display apparatus according to an embodiment of the present disclosure comprises a substrate including a display area and a non-display area positioned outside the display area and having a power supply wiring part, a first power supply wiring disposed in the power supply wiring part, a second power supply wiring disposed on the first power supply wiring, and a wiring electrically connected to the second power supply wiring.

According to some embodiments of the present disclosure, the light emitting display apparatus further includes a thin film transistor disposed at the display area, and a touch part disposed on the thin film transistor to overlap the display area and the non-display area. The touch part can include a first inorganic insulating layer, a first touch part disposed on the first inorganic insulating layer, a second inorganic insulating layer disposed on the first touch part, and a second touch part disposed on the second inorganic insulating layer. The wiring can be disposed on the first inorganic insulating layer at the non-display area.

According to some embodiments of the present disclosure, the wiring can be disposed at the power supply wiring part.

According to some embodiments of the present disclosure, the thin film transistor can include a source electrode and a drain electrode, and the first touch part and the second touch part can be formed of the same material as the source electrode and the drain electrode.

According to some embodiments of the present disclosure, the second inorganic insulating layer can be disposed to cover the wiring.

According to some embodiments of the present disclosure, the thin film transistor can include a source electrode and a drain electrode, and the first power supply wiring and the second power supply wiring can be formed of the same material as the source electrode and the drain electrode.

According to some embodiments of the present disclosure, the light emitting display apparatus can further include an anode disposed on the thin film transistor. The thickness of the wiring is larger than the thickness of the anode.

According to some embodiments of the present disclosure, the light emitting display apparatus can further include a plurality of sub-pixels disposed at the display area. The plurality of sub-pixels can be configured to have a pentile structure.

According to another embodiment of the present disclosure, a light emitting display apparatus comprises a substrate including a display area and a power supply wiring part disposed outside the display area, a thin film transistor disposed at the display area and including a source electrode and a drain electrode, a touch part disposed on the thin film transistor, a first power supply wiring disposed at the power supply wiring part, a second power supply wiring disposed on the first power supply wiring, and a wiring disposed on the second power supply wiring and electrically connected to the second power supply wiring.

According to some embodiments of the present disclosure, the touch part can include a first inorganic insulating layer, a first touch part disposed on the first inorganic insulating layer, a second inorganic insulating layer disposed on the first touch part, and a second touch part disposed on the second inorganic insulating layer. The wiring can be formed of the same material on the same layer as the first touch part.

According to some embodiments of the present disclosure, the first power supply wiring and the second power supply wiring can be formed of the same material as the source electrode and the drain electrode.

According to some embodiments of the present disclosure, the light emitting display apparatus can further include an anode disposed on the thin film transistor. The wiring can have a larger thickness than the anode.

It will be apparent to those skilled in the art that various modifications and variations can be made in the present disclosure without departing from the technical idea or scope of the disclosures. Thus, it may be intended that embodiments of the present disclosure cover the modifications and variations of the disclosure provided they come within the scope of the appended claims and their equivalents.

What is claimed is:
1. A light emitting display apparatus, comprising:
   a substrate including a display area, and a non-display area disposed outside of the display area;
   a power supply wiring part disposed in the non-display area;
   a first power supply wiring disposed in the power supply wiring part;
   a second power supply wiring disposed on the first power supply wiring;
   a third power supply wiring electrically connected to the second power supply wiring; and
   a touch part disposed in the display area and the non-display area,
   wherein an insulating layer of the touch part is disposed between the second power supply wiring and the third power supply wiring in the non-display area.
2. The light emitting display apparatus according to claim 1, further comprising:
   a thin film transistor disposed in the display area,
   wherein the touch part is disposed on the thin film transistor to overlap the display area and the non-display area,
   wherein the touch part includes:
      the insulating layer including a first inorganic insulating layer;
      a first touch part disposed on the first inorganic insulating layer;

a second inorganic insulating layer disposed on the first touch part; and a second touch part disposed on the second inorganic insulating layer, and wherein the third power supply wiring is disposed on the first inorganic insulating layer in the non-display area.

3. The light emitting display apparatus according to claim 2, wherein the third power supply wiring is included in the power supply wiring part.

4. The light emitting display apparatus according to claim 2, wherein the thin film transistor includes a source electrode and a drain electrode, and wherein the first touch part and the second touch part are formed of a same material as the source electrode and the drain electrode.

5. The light emitting display apparatus according to claim 2, wherein the second inorganic insulating layer is disposed to cover the third power supply wiring.

6. The light emitting display apparatus according to claim 2, wherein the thin film transistor includes a source electrode and a drain electrode, and wherein the first power supply wiring and the second power supply wiring are formed of a same material as the source electrode and the drain electrode.

7. The light emitting display apparatus according to claim 2, further comprising an anode disposed on the thin film transistor, wherein a thickness of the third power supply wiring is larger than a thickness of the anode.

8. The light emitting display apparatus according to claim 1, further comprising a plurality of sub-pixels disposed at the display area, wherein the plurality of sub-pixels is configured to have a pentile structure.

9. The light emitting display apparatus according to claim 1, wherein the first, second and third power supply wirings overlap each other, and wherein the second power supply wiring is disposed between the first power supply wiring and the third power supply wiring.

10. The light emitting display apparatus according to claim 9, wherein the first, second and third power supply wirings include a first portion forming a letter E shape in a plan view, wherein the first and second power supply wirings include a third portion having a bar shape disposed parallel to a back side of the letter E shape of the first portion, and wherein the first and second power supply wirings include a second portion including a plurality of wire segments connected between the back side of the letter E shape of the first portion and the third portion.

11. The light emitting display apparatus according to claim 1, further comprising a pad part disposed in the non-display area, wherein the first, second and third power supply wirings overlap each other in a first portion connected to the pad part, and wherein the first portion of the first, second and third power supply wirings and the pad part form a letter B shape in a plan view.

12. A light emitting display apparatus, comprising:

a substrate including a display area and a power supply wiring part disposed outside the display area;

a thin film transistor disposed in the display area and including a source electrode and a drain electrode;

a touch part disposed on the thin film transistor;

a first power supply wiring included in the power supply wiring part;

a second power supply wiring disposed on the first power supply wiring; and a third power supply wiring disposed on the second power supply wiring and electrically connected to the second power supply wiring, wherein an insulating layer of the touch part is disposed between the second power supply wiring and the third power supply wiring in a non-display area.

13. The light emitting display apparatus according to claim 12, wherein the touch part includes:

the insulating layer including a first inorganic insulating layer;

a first touch part disposed on the first inorganic insulating layer;

a second inorganic insulating layer disposed on the first touch part; and a second touch part disposed on the second inorganic insulating layer, and wherein the third power supply wiring is formed of a same material on a same layer as the first touch part.

14. The light emitting display apparatus according to claim 12, wherein the first power supply wiring and the second power supply wiring are formed of a same material as the source electrode and the drain electrode.

15. The light emitting display apparatus according to claim 12, further comprising an anode disposed on the thin film transistor, wherein a thickness of the third power supply wiring is larger than a thickness of the anode.

16. A light emitting display apparatus, comprising:

a substrate including a display area and a non-display area disposed outside of the display area, the display area including a plurality of sub-pixels each having an anode;

a first power supply wiring disposed in the non-display area;

a second power supply wiring disposed on the first power supply wiring in the non-display area;

a third power supply wiring electrically connected to the second power supply wiring; and a touch part disposed in the display area and the non-display area, wherein the first, second and third power supply wirings are electrically connected to the plurality of sub-pixels, wherein an insulating layer of the touch part is disposed between the second power supply wiring and the third power supply wiring in the non-display area, and wherein a thickness of the third power supply wiring is larger than a thickness of the anode in each of the plurality of sub-pixels.

17. The light emitting display apparatus according to claim 16, wherein the first, second and third power supply wirings overlap each other in the non-display area, and wherein the second power supply wiring is disposed between the first power supply wiring and the third power supply wiring.

18. The light emitting display apparatus according to claim 16, further comprising:

a first inorganic insulating layer disposed in the display area and the non-display area; and a plurality of touch electrodes disposed on the first inorganic insulating layer in the display area, wherein the first inorganic insulating layer is disposed between the second power supply wiring and the third power supply wiring in the non-display area.

19. The light emitting display apparatus according to claim 16, further comprising:
a pad part disposed in the non-display area,
wherein the first, second and third power supply wirings include a first portion having a plurality of branch portions extending toward the pad part.

20. The light emitting display apparatus according to claim 19, wherein the first and second power supply wirings include a second portion having a bar shape, and a third portion having a plurality of wire segments connected between the first portion and the second portion.

* * * * *